United States Patent
Yagi

(10) Patent No.: US 12,480,052 B2
(45) Date of Patent: Nov. 25, 2025

(54) LIQUID CRYSTAL POLYMER COMPOSITION AND LIQUID CRYSTAL POLYMER MOLDED ARTICLE

(71) Applicant: OTSUKA CHEMICAL CO., LTD., Osaka (JP)

(72) Inventor: Hiroshi Yagi, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 0 days.

(21) Appl. No.: 18/559,597

(22) PCT Filed: Jun. 16, 2022

(86) PCT No.: PCT/JP2022/024119
§ 371 (c)(1),
(2) Date: Nov. 8, 2023

(87) PCT Pub. No.: WO2023/276698
PCT Pub. Date: Jan. 5, 2023

(65) Prior Publication Data
US 2024/0240087 A1    Jul. 18, 2024

(30) Foreign Application Priority Data
Jun. 30, 2021    (JP) ................... 2021-108930

(51) Int. Cl.
*G02F 1/1333* (2006.01)
*C09K 19/54* (2006.01)
*C09K 19/52* (2006.01)

(52) U.S. Cl.
CPC ...... *C09K 19/542* (2013.01); *C09K 2019/521* (2013.01)

(58) Field of Classification Search
CPC ...... C09K 19/52; C09K 19/54; C09K 19/542; C09K 2019/521; G02F 1/1333
See application file for complete search history.

(56) References Cited

U.S. PATENT DOCUMENTS

| | | |
|---|---|---|
| 2015/0291796 A1 | 10/2015 | Kim |
| 2016/0068652 A1 | 3/2016 | Akashi et al. |
| 2018/0086914 A1 | 3/2018 | Kim |
| 2020/0247996 A1 | 8/2020 | Kim |
| 2022/0098410 A1 | 3/2022 | Kim |
| 2022/0380675 A1 | 12/2022 | Maruo et al. |
| 2024/0240087 A1* | 7/2024 | Yagi ................ C08L 67/00 |

FOREIGN PATENT DOCUMENTS

| | | |
|---|---|---|
| JP | 5-32870 A | 2/1993 |
| JP | 2003-253098 A | 9/2003 |
| JP | 2010-209234 A | 9/2010 |
| JP | 2012-136625 A | 7/2012 |
| JP | 2017-513976 A | 6/2017 |
| JP | 2020-186323 A | 11/2020 |
| TW | I607049 B | 12/2017 |
| TW | 202128877 A | 8/2021 |
| WO | 2015/083759 A1 | 6/2015 |
| WO | 2021/117607 A1 | 6/2021 |

OTHER PUBLICATIONS

Notification of Transmittal of Translation of the International Preliminary Report on Patentability (Form PCT/IB/338) issued in counterpart International application No. PCT/JP2022/024119 mailed Jan. 11, 2024 with Forms PCT/IB/373 and PCT/ISA/237. (5 pages).
International Search Report dated Aug. 30, 2022, issued in counterpart International Application No. PCT/JP2022/024119 (3 pages).
Office Action dated May 21, 2025, issued in counterpart TW Application No. 111122989. (7 pages).

* cited by examiner

*Primary Examiner* — Geraldina Visconti
(74) *Attorney, Agent, or Firm* — WHDA, LLP

(57) ABSTRACT

Provided is a liquid crystal polymer composition capable of providing a molded article excellent in adhesion to an adhesive agent, such as epoxy resin, and improving the adhesion between components made of the molded article or the adhesion between a component made of the molded article and other components. A liquid crystal polymer composition contains a liquid crystal polymer (A), a semi-aromatic polyamide resin (B), and barium sulfate (C).

10 Claims, No Drawings

LIQUID CRYSTAL POLYMER COMPOSITION AND LIQUID CRYSTAL POLYMER MOLDED ARTICLE

TECHNICAL FIELD

The present invention relates to liquid crystal polymer compositions and molded liquid crystal polymer articles using the liquid crystal polymer compositions.

BACKGROUND ART

Liquid crystal polymers are used in various components because they are excellent in mechanical strength, moldability, dimensional accuracy, chemical resistance, moisture resistance, electrical properties, and so on. Particularly, because the liquid crystal polymers have excellent thermal resistance and thin-wall moldability, use thereof in electronic components of precision equipment and the like is under consideration and, for example, use in a camera module is under consideration.

If any tiny speck of dirt, dust or like foreign matter adheres to a lens or an image sensor in a camera module, the camera module decreases its optical properties. Therefore, for the purpose of preventing this decrease in optical properties, components for use in camera modules are generally ultrasonically cleaned prior to the assembly of them to remove tiny specks of dirt, dust or like foreign matter adhering to the surfaces of the components. However, because liquid crystal polymers have high crystalline orientation, it is known that a molded article made of liquid crystal polymer (a molded liquid crystal polymer article) is likely to cause surface delamination and particularly the molded article when subjected to ultrasonic cleaning causes a phenomenon of surface delamination and napping (fibrillation). It is known that these fibrillated portions of the molded article are likely to produce small powder (particles), and even tiny foreign matter of less than 1 μm may cause failures in camera modules due to increased number of pixels involved in performance advances of the camera modules. Furthermore, it is necessary to sufficiently clean the components of the camera modules prior to the assembly of them and also assemblies by ultrasonic cleaning under strict conditions, which may decrease the productivity.

As an example of liquid crystal polymer compositions for use in the above camera modules, Patent Literature 1 below discloses a composition containing a thermotropic liquid crystal polymer and inorganic particles having a Mohs hardness of 2.5 or more.

CITATION LIST

Patent Literature

Patent Literature 1: JP-A-2017-513976

SUMMARY OF INVENTION

Technical Problem

In recent years, because of increasing number of cameras loaded into a single smartphone, novel actuator mechanisms, such as an integrated AF and OIS mechanism, toward enabling inexpensive production of camera modules have become widespread and size and thickness reduction of equipment and its components is correspondingly progressing.

Focusing on members for camera modules, a high number of pixels over a hundred million and a high-magnification optical zoom mechanism are loaded into a camera module, which results in the focusing of technical attention on a weight increase of the entire camara module due to an increased number of elements of each lens and an increased size of each lens itself, an increase in stress due to a novel structure adopted in the camera module, and so on and has caused problems never seen before.

Specifically, due to the weight increase of the entire camera module and the increase in stress, the adhesion force between an adhesive agent bonding the components together and the components becomes insufficient, which produces a problem of detachment of the components. Particularly, detachment between components resulting from fall of the camera module leads directly to failures in product performance, such as effects on the operation of the camera module. Therefore, firm bonding between components with an adhesive agent is required and improvement in adhesion force between the adhesive agent bonding the components together and the components is becoming a big challenge. In addition, for the purpose of smoothly operating the actuator mechanisms as discussed above, molded liquid crystal polymer articles forming the components of these mechanisms are required to increase their adhesion to an adhesive agent, such as epoxy resin.

However, Patent Literature 1 does not at all discuss and suggest any challenge for improvement in adhesion to an adhesive agent and the molded crystal polymer article described in Patent Literature 1 has a problem of insufficient adhesion to an adhesive agent, such as epoxy resin.

The present invention has been completed as a result of accomplishing an object of providing: a liquid crystal polymer composition capable of improving, in light of increased size reduction and thickness reduction of precision equipment and its components, adhesion between the components for use in the equipment; and a molded liquid crystal polymer article which is a molded article of the liquid crystal polymer composition.

Therefore, the present invention is aimed at solving the above problem and, specifically, has an object of providing: a liquid crystal polymer composition capable of providing a molded article excellent in adhesion to an adhesive agent, such as epoxy resin, and improving adhesion between components made of the molded article or adhesion between a component made of the molded article and other components; and a molded liquid crystal polymer article which is a molded article of the liquid crystal polymer composition.

Solution to Problem

The inventor conducted intensive studies to solve the above problem, thus found that when a liquid crystal polymer composition containing a liquid crystal polymer (A), a semi-aromatic polyamide resin (B), barium sulfate (C) is formed into a molded article, excellent effects of adhesion to an adhesive agent, such as epoxy resin, can be achieved, and completed the present invention. Specifically, the gist of the present invention is as follows.

Aspect 1: A liquid crystal polymer composition containing a liquid crystal polymer (A), a semi-aromatic polyamide resin (B), and barium sulfate (C).

Aspect 2: The liquid crystal polymer composition according to aspect 1, wherein a fraction of a structural unit derived from an aromatic monomer in all structural units constituting the semi-aromatic polyamide resin (B) is 20% by mole or more.

Aspect 3: The liquid crystal polymer composition according to aspect 1 or 2, wherein the semi-aromatic polyamide resin (B) has a melting point of 230° C. to 350° C.

Aspect 4: The liquid crystal polymer composition according to any one of aspects 1 to 3, wherein a content of the semi-aromatic polyamide resin (B) is 0.1% by mass to 5.0% by mass in a total amount of 100% by mass of the liquid crystal polymer composition.

Aspect 5: The liquid crystal polymer composition according to any one of aspects 1 to 4, wherein the liquid crystal polymer (A) is a wholly aromatic liquid crystal polymer.

Aspect 6: The liquid crystal polymer composition according to any one of aspects 1 to 5, further containing a reinforcing material (D).

Aspect 7: The liquid crystal polymer composition according to aspect 6, wherein the reinforcing material (D) is treated with a hydrophobic surface treatment agent.

Aspect 8: The liquid crystal polymer composition according to aspect 7, wherein the hydrophobic surface treatment agent is alkoxysilane represented by a general formula (I) below:

$$R^1{}_n Si(OR^2)_{4-a} \quad \text{Formula (I)}$$

wherein in the general formula (I) n represents an arbitrary integer selected from 1 to 3, $R^1$ represents an alkyl group, an alkenyl group or an aryl group, and $R^2$ represents an alkyl group.

Aspect 9: The liquid crystal polymer composition according to any one of aspects 6 to 8, wherein the reinforcing material (D) has an average fiber length of 1 μm to less than 300 μm.

Aspect 10: The liquid crystal polymer composition according to any one of aspects 6 to 9, wherein the reinforcing material (D) is at least one type of fibers selected from potassium titanate fibers and wollastonite fibers.

Aspect 11: The liquid crystal polymer composition according to any one of aspects 6 to 10, wherein a content of the reinforcing material (D) is 0.1% by mass to 40% by mass in a total amount of 100% by mass of the liquid crystal polymer composition.

Aspect 12: The liquid crystal polymer composition according to any one of aspects 1 to 11, being used in a camera module.

Aspect 13: A molded liquid crystal polymer article being a molded article of the liquid crystal polymer composition according to any one of aspects 1 to 12.

Advantageous Effects of Invention

The present invention enables provision of: a liquid crystal polymer composition capable of providing a molded article excellent in adhesion to an adhesive agent, such as epoxy resin, and improving the adhesion between components made of the molded article or the adhesion between a component made of the molded article and other components; and a molded liquid crystal polymer article which is a molded article of the liquid crystal polymer composition.

DESCRIPTION OF EMBODIMENTS

Hereinafter, a description will be given of examples of a preferred embodiment for working of the present invention. However, the following embodiment is simply illustrative. The present invention is not at all limited by the following embodiment.

<Liquid Crystal Polymer Composition>

A liquid crystal polymer composition according to the present invention contains a liquid crystal polymer (A), a semi-aromatic polyamide resin (B), and barium sulfate (C) and may further contain, as necessary, a reinforcing material (D), a particulate carbon material (E), fluorine-contained resin (F), a solid lubricant, and other additives.

Since the liquid crystal polymer composition according to the present invention has the above structure, it can provide a molded article excellent in adhesion to an adhesive agent, such as epoxy resin, and improve the adhesion between components made of the molded article or the adhesion between a component made of the molded article and other components.

A description will be given below of components and so on of the liquid crystal polymer composition according to the present invention.

<Components of Liquid Crystal Polymer Composition>

(Liquid Crystal Polymer (A))

The liquid crystal polymer composition according to the present invention contains a liquid crystal polymer (A) (hereinafter, also referred to as a "component (A)"). The liquid crystal polymer (A) refers to a melt-processable polymer having a property capable of forming an optically anisotropic molten phase and is not particularly limited so long as it is what is termed a thermotropic liquid crystal polymer in the art. The optically anisotropic molten phase can be confirmed by normal ellipsometry using an orthogonal polarizer.

The liquid crystal polymer (A) has an elongated molecular shape and has a flat molecular chain having high rigidity along the long chain (wherein the molecular chain is referred to as a "mesogenic group"). The liquid crystal polymer (A) may have a mesogenic group in one or both of a polymer main chain and a polymer side chain. However, when a resulting molded liquid crystal polymer article requires higher thermal resistance, the preferred liquid crystal polymer (A) is one in which the polymer main chain contains a mesogenic group.

Examples of the component (A) include liquid crystal polyester, liquid crystal polyester amide, liquid crystal polyester ether, liquid crystal polyester carbonate, liquid crystal polyester imide, and liquid crystal polyamide. Among these liquid crystal polymers, liquid crystal polyester, liquid crystal polyester amide or liquid crystal polyamide is preferred as the component (A) from the viewpoint of obtaining a molded liquid crystal polymer article having higher strength. Alternatively, from the viewpoint of obtaining a lower water-absorption molded liquid crystal polymer article, liquid crystal polyester or liquid crystal polyester amide is preferred as the component (A) and liquid crystal polyester is more preferred as the component (A).

More specifically, examples include liquid crystal polymers (A1) to (A6) below and the component (A) is preferably a wholly aromatic liquid crystal polymer obtained using only an aromatic compound as a raw material monomer. A liquid crystal polymer selected from them may be used singly as the component (A) or a combination of two or more of them may be used as the component (A).

Examples include the following liquid crystal polymers:
(A1) liquid crystal polyester composed of repeating units represented by Formula (I);
(A2) liquid crystal polyester composed of repeating units represented by Formula (2) and repeating units represented by Formula (3);

(A3) liquid crystal polyester composed of repeating units represented by Formula (1), repeating units represented by Formula (2), and repeating units represented by Formula (3);

(A4) liquid crystal polyester amide or liquid crystal polyamide in which some or all of the repeating units represented by Formula (1) in (A1) are substituted with repeating units represented by Formula (4);

(A5) liquid crystal polyester amide or liquid crystal polyamide in which some or all of the repeating units represented by Formula (3) in (A2) are substituted with repeating units represented by Formula (5) and/or repeating units represented by Formula (6); and (A6) liquid crystal polyester amide in which some or all of the repeating units represented by Formula (3) in (A3) are substituted with repeating units represented by Formula (5) and/or repeating units represented by Formula (6).

A liquid crystal polymer selected from these liquid crystal polymers may be used singly as the component (A) or a combination of two or more of them may be used as the component (A).

[Chem. 1]

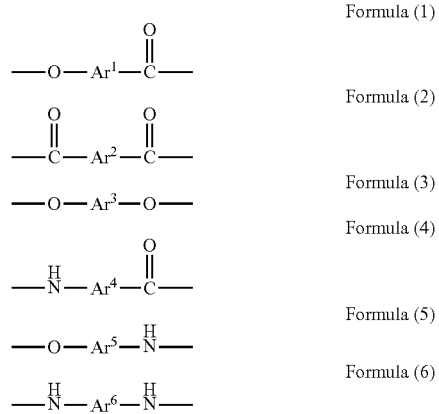

In the formulae, $Ar^1$ and $Ar^2$ each independently represent a 1,4-phenylene group, a 2,6-naphthalenediyl group or a 4,4-biphenylene group, $Ar^2$, $Ar^3$, $Ar^5$, and $Ar^6$ each independently represent a 1,4-phenylene group, a 2,6-naphthalenediyl group, a 1,3-phenylene group or a 4,4-biphenylene group, and regarding $Ar^1$, $Ar^2$, $Ar^3$, $Ar^4$, $Ar^5$, and $Ar^6$ some or all of the hydrogen atoms on the aromatic ring may be substituted with halogen atoms, alkyl groups or aryl groups.

The repeating units represented by Formula (1) are repeating units derived from an aromatic hydroxycarboxylic acid. Examples of the aromatic hydroxycarboxylic acid include 4-hydroxybenzoic acid, 3-hydroxybenzoic acid, 6-hydroxy-2-naphthoic acid, 7-hydroxy-2-naphthoic acid, 6-hydroxy-1-naphthoic acid, 4-hydroxybiphenyl-4-carboxylic acid, and aromatic hydroxycarboxylic acids in which some or all of the hydrogens on the aromatic ring in each of the above aromatic hydroxycarboxylic acids are substituted with alkyl groups, aryl groups or halogen atoms.

The repeating units represented by Formula (2) are repeating units derived from an aromatic dicarboxylic acid. Examples of the aromatic dicarboxylic acid include terephthalic acid, phthalic acid, 2,4-diphenyldicarboxylic acid, 2,6-naphthalenedicarboxylic acid, isophthalic acid, and aromatic dicarboxylic acids in which some or all of the hydrogens on the aromatic ring in each of the above aromatic dicarboxylic acids are substituted with alkyl groups, aryl groups or halogen atoms.

The repeating units represented by Formula (3) are repeating units derived from an aromatic diol. Examples of the aromatic diol include hydroquinone, resorcin, naphthalene-2,6-diol, 4,4-biphenylenediol, 3,3-biphenylenediol, 4,4-dihydroxydiphenyl ether, 4,4-dihydroxydiphenyl sulfone, and aromatic diols in which some or all of the hydrogens on the aromatic ring in each of the above aromatic diols are substituted with alkyl groups, aryl groups or halogen atoms.

The repeating units represented by Formula (4) are repeating units derived from an aromatic aminocarboxylic acid. Examples of the aromatic aminocarboxylic acid include 4-aminobenzoic acid, 3-aminobenzoic acid, 6-amino-2-naphthoic acid, and aromatic aminocarboxylic acids in which some or all of the hydrogens on the aromatic ring in each of the above aromatic aminocarboxylic acids are substituted with alkyl groups, aryl groups or halogen atoms.

The repeating units represented by Formula (5) are repeating units derived from an aromatic amine having a hydroxy group and examples include 4-aminophenol, 3-aminophenol, 4-amino-1-naphthol, 4-amino-4-hydroxydiphenyl, and aromatic hydroxyamines in which some or all of the hydrogens on the aromatic ring in each of the above aromatic amines with a hydroxy group are substituted with alkyl groups, aryl groups or halogen atoms.

The repeating units represented by Formula (6) are structural units derived from an aromatic diamine and examples include 1,4-phenylenediamine, 1,3-phenylenediamine, and aromatic diamines in which some or all of the hydrogens on the aromatic ring in each of the above aromatic diamines are substituted with alkyl groups, aryl groups or halogen atoms.

Examples of the alkyl group listed as an example of the substituents in the above structural units include linear, branched or alicyclic alkyl groups having 1 to 10 carbon atoms, including a methyl group, an ethyl group, a propyl group, an isopropyl group, a butyl group, a tert-butyl group, a hexyl group, a cyclohexyl group, an octyl group, and a decyl group. Examples of the aryl group include aryl groups having 6 to 10 carbon atoms, including a phenyl group and a naphthyl group. Examples of the halogen atom include a fluorine atom, a chlorine atom, a bromine atom, and an iodine atom.

Among the components (A), in view of providing a molded liquid crystal polymer article having higher thermal resistance and higher dimensional stability, at least one liquid crystal polyester selected from the group consisting of (A1) to (A3) is preferred and liquid crystal polyester (A1) or (A3) is particularly preferred.

The liquid crystal polymer (A) for use in the present invention preferably has a melting point of 150° C. or higher from the viewpoint of further reducing deformation, discoloration, and so on and further increasing the thermal resistance of the resultant molded article. Furthermore, for the purpose of further reducing thermal decomposition of the liquid crystal polymer (A) during melting processing, including extrusion, molding, and spinning, the melting point is preferably not higher than 350° C. and more preferably not higher than 330° C. The melting point can be measured in conformity with JIS K 7121.

Among the components (A), preferred liquid crystal polymers are those of which the melt viscosity as measured at a temperature 20° C. to 40° C. higher than the melting point is $1.0 \times 10^3$ mPa·s to $1.0 \times 10^5$ mPa·s. For example, depending on the thermal deformation temperature, liquid crystal polymers having a deflection temperature of 260° C. or higher under load are referred to as a type I and liquid crystal polymers having a deflection temperature of not lower than 210° C. and lower than 260° C. under load are referred to as a type II. The liquid crystal polymers of type I are measured in terms of melt viscosity at a temperature 30° C. higher than the melting point and the liquid crystal polymers of type II are measured in terms of melt viscosity at a temperature 40° C. higher than the melting point. The above melt viscosity can be acquired by using a capillary rheometer to measure the viscosity of a sample passing through an orifice with a diameter of 1 mm and a length of 10 mm at a shear rate of $1.0 \times 10^3$ sec$^{-1}$.

The form of the component (A) is not particularly limited so long as it can be melt-kneaded. For example, any one of powdered, granular, and pelletized forms can be used.

The content of the component (A) in the liquid crystal polymer composition according to the present invention is, in a total amount of 100% by mass of the liquid crystal polymer composition, preferably 40% by mass to 98% by mass, more preferably 50% by mass to 94% by mass, and still more preferably 60% by mass to 90% by mass.

(Semi-Aromatic Polyamide Resin (B))

The liquid crystal polymer composition according to the present invention contains a semi-aromatic polyamide resin (B)(hereinafter, also referred to as a "component (B)"). The semi-aromatic polyamide resin (B) for use in the present invention is a polymer having an amide bond (—NH—C(=O)—) in a main chain. The semi-aromatic polyamide resin (B) refers to a polyamide resin containing, as its structural units, at least one structural unit derived from any one of aliphatic monomers to be described hereinafter and at least one structural unit derived from any one of aromatic monomers to be described hereinafter. The semi-aromatic polyamide resin (B) may contain a polymer consisting of a single structural unit, such as a polymer of aminocarboxylic acid, or a polymer consisting of a plurality of structural units, such as a copolymer of diamine and dicarboxylic acid or a copolymer of diamine, dicarboxylic acid, and aminocarboxylic acid. In the case of a copolymer consisting of a plurality of structural units, the ratio of copolymerization, the form of copolymerization (such as random copolymerization, block copolymerization or alternating copolymerization) can be arbitrarily selected.

Although much remains unclear about the mechanism of, among the effects of the present invention, the effect that the molded liquid crystal polymer article can further increase the adhesion to an adhesive agent, such as epoxy resin, the reason for the mechanism can be that in bonding components made of the molded liquid crystal polymer article together with an adhesive agent, such as epoxy resin, or bonding a component made of the molded liquid crystal polymer article to other components with the adhesive agent, incorporation of the semi-aromatic polyamide resin (B) into the liquid crystal polymer composition forming the molded article causes acceleration of the chemical reaction of an end group (such as an amide group, an amino group, a carboxyl group or an aminocarboxyl group) of the semi-aromatic polyamide resin (B) with the adhesive agent having an epoxy group or a glycidyl group, such as epoxy resin, which increases the adhesion of a component made of the molded article to the adhesive agent, such as epoxy resin, and thus enables, upon impact or fall of equipment or its components, suppression of detachment of the components adhering to each other. The above-described other components preferably have excellent adhesion to an epoxy adhesive.

From the viewpoint of further increasing the adhesion force to an adhesive agent, such as epoxy resin, the polymerization method for the semi-aromatic polyamide resin (B) is preferably melt polymerization (continuous polymerization) producing much residual unreacted monomer. Although solid phase polymerization producing less residual unreacted monomer may be applied as the polymerization method for the semi-aromatic polyamide resin (B), melt polymerization (continuous polymerization) is preferred because the semi-aromatic polyamide resin (B) contains many reactive ends of the residual unreacted monomer.

Among the structural units of the semi-aromatic polyamide resin (B), examples of those derived from aliphatic monomers include aliphatic dicarboxylic acid, aliphatic diamine, alicyclic diamine, aliphatic aminocarboxylic acid, and alicyclic dicarboxylic acid.

Examples of aliphatic dicarboxylic acid include succinic acid, pentanedioic acid, adipic acid, pimelic acid, suberic acid, azelaic acid, sebacic acid, 1,9-nonanedicarboxylic acid, 1,10-decanedicarboxylic acid, and 1,11-undecanedicarboxylic acid. Among them, adipic acid is preferred. These aliphatic dicarboxylic acids may be used singly or in combination of two or more of them.

Examples of aliphatic diamine include ethylenediamine, trimethylenediamine, tetramethylenediamine, pentamethylenediamine, hexamethylenediamine, 1,7-diaminoheptane, 1,8-diaminooctane, 1,9-diaminononane, 1,10-diaminodecane, 1,11-diaminoundecane, 1,12-diaminododecane, 2-methyl-1,5-diaminopentane, 3-methyl-1,5-diaminopentane, and 2-ethyltetramethylenediamine. Among them, hexamethylenediamine, 1,9-diamimnonane, 1,10-diaminodecane, and 2-methylpentamethylenediamine are preferred. These aliphatic diamines may be used singly or in combination of two or more of them.

Examples of alicyclic diamine include 1,2-diaminocyclohexane, 1,3-diaminocyclohexane, 1,4-diaminocyclohexane, 1,3-bis(aminomethyl)cyclohexane, bis(aminomethyl)cyclohexane, bis(4-aminocyclohexyl)methane, 4,4'-diamino-3,3'-dimethyldicyclohexylmethane, and isophoronediamine. These alicyclic diamines may be used singly or in combination of two or more of them.

Examples of aliphatic aminocarboxylic acid include 6-aminocaproic acid, 7-aminoheptanoic acid, 8-aminooctanoic acid, 9-aminononanoic acid, 10-aminodecanoic acid, 11-aminoundecanoic acid, and 12-aminododecanoic acid. Alternatively, cyclic lactams corresponding to these aliphatic aminocarboxylic acids may be used in a ring-opened form. These aliphatic aminocarboxylic acids may be used singly or in combination of two or more of them.

Examples of alicyclic dicarboxylic acid include 1,2-cyclohexanedicarboxylic acid, 1,3-cyclohexanedicarboxylic acid, and 1,4-cyclohexanedicarboxylic acid. Among them, 1,4-cyclohexanedicarboxylic acid is preferred. These alicyclic dicarboxylic acids may be used singly or in combination of two or more of them.

Among the structural units of the semi-aromatic polyamide resin (B), examples of those derived from aromatic monomers include aromatic diamine, aromatic dicarboxylic acid, and aromatic aminocarboxylic acid.

Examples of aromatic diamine include p-phenylenediamine, o-phenylenediamine, m-phenylenediamine, p-xylenediamine, o-xylenediamine, and m-xylenediamine. These aromatic diamines may be used singly or in combination of two or more of them.

Examples of aromatic dicarboxylic acid include terephthalic acid, isophthalic acid, phthalic acid, 2-methylterephthalic acid, and naphthalenedicarboxylic acid. Among them, terephthalic acid or isophthalic acid is preferred. These aromatic dicarboxylic acids may be used singly or in combination of two or more of them.

Examples of aromatic aminocarboxylic acid include p-aminobenzoic acid and p-aminomethylbenzoic acid. These aromatic aminocarboxylic acids may be used singly or in combination of two or more of them.

Specific examples of the semi-aromatic polyamide resin (B) for use in the present invention include semi-aromatic polyamide resins, such as polyamide MXD6, polyamide 4T, polyamide 6T, polyamide 9T, and polyamide 10T.

The semi-aromatic polyamide resin (B) for use in the present invention preferably has a melting point of 230° C. or higher, more preferably 260° C. or higher, still more preferably 270° C. or higher, and particularly preferably 290° C. or higher from the viewpoint of further reducing deformation, discoloration, and so on and further increasing the thermal resistance of the resultant molded article. Furthermore, for the purpose of further reducing thermal decomposition of the polyamide resin during melting processing, including extrusion, molding, and spinning, the melting point is preferably 350° C. or lower and more preferably 330° C. or lower. The melting point can be measured in conformity with JIS K 7121.

The semi-aromatic polyamide resin (B) for use in the present invention is preferably a semi-aromatic polyamide resin of which the melt viscosity as measured at a temperature 10° C. to 30° C. higher than the melting point is $1.0 \times 10^3$ mPa·s to $3.0 \times 10^5$ mPa·s. The above melt viscosity can be acquired by using a capillary rheometer to measure the viscosity of a sample passing through an orifice with a diameter of 1 mm and a length of 10 mm at a shear rate of $1.2 \times 10^3$ sec$^{-1}$.

In the semi-aromatic polyamide resin (B) for use in the present invention, the fraction of structural units derived from aromatic monomers in all structural units constituting the semi-aromatic polyamide resin (B) is preferably 20% by mole or more, more preferably 25% by mole or more, and still more preferably 25% by mole to 60% by mole. As used herein, the mole fraction of the structural units derived from aromatic monomers in the semi-aromatic polyamide resin (B) refers to the mole fraction of aromatic monomers in all monomers used as source materials for polymerization.

The semi-aromatic polyamide resin (B) is preferably a semi-aromatic polyamide resin containing, as its structural units, a structural unit derived from aromatic dicarboxylic acid and a structural unit derived from aliphatic diamine and more preferably a semi-aromatic polyamide resin containing, as its structural units, a structural unit derived from aromatic dicarboxylic acid, a structural unit derived from aliphatic dicarboxylic acid, and a structural unit derived from aliphatic diamine.

Particularly preferred examples of the semi-aromatic polyamide resin (B) include: a copolymer of 45% by mole to 55% by mole (particularly, approximately 50% by mole) terephthalic acid, 20% by mole to 30% by mole (particularly, approximately 25% by mole)hexamethylenediamine, and 20% by mole to 30% by mole (particularly, approximately 25% by mole) 2-methylpentamethylenediamine; a copolymer of 30% by mole to 35% by mole (particularly, approximately 32% by mole) terephthalic acid, 15% by mole to 20% by mole (particularly, approximately 18% by mole) adipic acid, and 45% by mole to 55% by mole (particularly, approximately 50% by mole) hexamethylenediamine; and a copolymer of 25% by mole to 30% by mole (particularly, approximately 27.5% by mole) terephthalic acid, 20% by mole to 25% by mole (particularly, approximately 22.5% by mole) adipic acid, and 45% by mole to 55% by mole (particularly, approximately 50% by mole)hexamethylenediamine. By appropriately selecting the composition ratio among the aromatic monomers and other monomer components constituting the semi-aromatic polyamide resin (B) and the types of them, the physical properties of the semi-aromatic polyamide resin (B), such as melting point, can be appropriately adjusted.

In the present invention, from the viewpoint of further reducing the decrease in mechanical strength due to the semi-aromatic polyamide resin (B) and further increasing the adhesion to an adhesive agent, such as epoxy resin, the content of the semi-aromatic polyamide resin (B) is, in a total amount of 100% by mass of the liquid crystal polymer composition, preferably 0.1% by mass to 5.0% by mass, more preferably 0.15% by mass to 4.0% by mass, still more preferably 0.2% by mass to 3.0% by mass, particularly preferably 0.2% by mass to 1.5% by mass, and most preferably 0.2% by mass to 1.3% by mass.

From the viewpoint of further increasing the adhesion to an adhesive agent, such as epoxy resin, further reducing the production of particles of the liquid crystal polymer composition, and further increasing the mechanical strength, such as bending strength, the content of the semi-aromatic polyamide resin (B) is, in a total amount of 100% by mass of the liquid crystal polymer composition, preferably 0.1% by mass to less than 5.0% by mass, more preferably 0.2% by mass to 4.5% by mass, still more preferably 0.3% by mass to 3.5% by mass, particularly preferably 0.4% by mass to less than 2.5% by mass, more particularly preferably 0.8% by mass to less than 2.5% by mass, even more particularly preferably 0.9% by mass to less than 1.8% by mass, and most preferably 0.9% by mass to less than 1.5% by mass.

(Barium Sulfate (C))

The liquid crystal polymer composition according to the present invention contains barium sulfate (C) (hereinafter, also referred to as a "component (C)"). Examples of the component (C) include: ground barium sulfate (barite powder) obtained by grinding a mineral called barite, deironing the ground product, and elutriating it; and precipitated barium sulfate obtained by artificial synthesis. Precipitated barium sulfate can be controlled in particle size depending on conditions during synthesis. Thus, desired fine-grained barium sulfate containing only a small amount of coarse particles can be produced. From the viewpoint of further reducing impurities and further homogenizing the particle size distribution of barium sulfate, precipitated barium sulfate is preferably used.

The component (C) is preferably in powder form and its average particle diameter is preferably 0.1 μm to 50 μm, more preferably 0.1 μm to 30 μm, still more preferably 0.1 μm to 5 pin, yet still more preferably 0.15 μm to 1.2 μm, particularly preferably 0.2 μm to 0.8 μm, and most preferably 0.2 μm to 0.5 μm. By defining the average particle diameter within the above range, the coefficient of friction during sliding can be further decreased and the production of particles can be further suppressed.

The average particle diameter of the component (C) can be measured by the laser diffraction and scattering method. More specifically, the average particle diameter of the component (C) is a particle diameter at a volume-based cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The particle shape of the component (C) is not particularly limited so long as the component (C) is non-fibrous particles, such as spherical, prismoidal, platy, rodlike, columnar, blocky or amorphous particles, but a spherical or amorphous shape is preferred. The particle shape of the component (C) can be analyzed, for example, by observation with a scanning electron microscope (SEM). The component (C) may be subjected to surface treatment and examples of the treatment agent include a coating agent, a dispersant, and a modifier. Specifically, examples of the treatment agent include fatty acids, waxes, non-ionic surfactants, epoxy-based compounds, isocyanate-based compounds, silane-based compounds, titanate-based compounds, phosphorus-based compounds, aluminates, such as alumina, silicates, such as silicon dioxide, titanates, such as titanium dioxide. These treatment agents may be used singly or in combination of two or more of them.

The content of the component (C) in the liquid crystal polymer composition according to the present invention is, in a total amount of 100% by mass of the liquid crystal polymer composition, preferably 1% by mass to 30% by mass, more preferably 1% by mass to 20% by mass, still more preferably 1% by mass to 15% by mass, and most preferably 1.5% by mass to 2.5% by mass. By defining the content of the component (C) within the range of 1% by mass to 30% by mass, the production of particles can be further reduced.

(Reinforcing Material (D))

The liquid crystal polymer composition according to the present invention may contain, as necessary, a reinforcing material (D) (hereinafter, also referred to as a "component (D)"). The component (D) is a powdered reinforcing material formed of particles and the shape of the particles is not particularly limited so long as it can increase the strength and rigidity of the resin composition. Examples that can be used as the component (D) include: a fibrous reinforcing material (D1) (hereinafter, also referred to as a "component (D1)") which is powder formed of fibrous particles; and a platy reinforcing material (D2) (hereinafter, also referred to as a "component (D2)") which is powder formed of platy particles. Among them, at least one selected from the group consisting of the fibrous reinforcing material (D1) and the platy reinforcing material (D2) is preferred. The particle shape of the component (D) can be analyzed, for example, by observation with a scanning electron microscope (SEM).

Fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e., B>T). The length L and the breadth B correspond to the fiber length and the fiber diameter, respectively. The platy particles refer to particles having an L/B of less than 3 and an UT of 3 or more.

Specific examples of the fibrous reinforcing material (D1) include: inorganic fibers, such as carbon fibers, glass fibers, potassium titanate fibers, wollastonite fibers, aluminum borate, magnesium borate, xonotlite, zinc oxide, basic magnesium sulfate, alumina fibers, silicon carbide fibers, and boron fibers; and organic fibers, such as aramid fibers and polyphenylene benzoxazole (PBO) fibers. The inorganic fibers are preferred. These types of fibrous reinforcing materials (D1) may be used singly or in combination of two or more of them.

From the viewpoint of further reducing the production of particles, the fibrous reinforcing material (D1) is preferably particles having a Mohs hardness of not less than 2.5 and not more than 5 and more preferably at least one type of fibers of potassium titanate fibers and wollastonite fibers. The Mohs hardness is an index indicating the hardness of substances, wherein when two different minerals are rubbed against each other, scratched one of them is a substance having a lower hardness.

From the viewpoint of further reducing the production of particles, the average fiber length of the fibrous reinforcing material (D1) is preferably 1 μm to 300 μm, more preferably not less than 1 μm and less than 300 μm, still more preferably 1 μm to 200 μm, particularly preferably 3 μm to 100 μm, and most particularly preferably 5 μm to 50 μm. The average aspect ratio of the fibrous reinforcing material (D1) is preferably 3 to 200, more preferably 3 to 100, still more preferably 3 to 50, and particularly preferably 3 to 40.

Heretofore known potassium titanate fibers can be widely used as the above potassium titanate fibers and examples include potassium tetratitanate fibers, potassium hexatitanate fibers, and potassium octatitanate fibers. The dimensions of the potassium titanate fibers are not particularly limited so long as they are in the above-described ranges of dimensions, but the average fiber length thereof is preferably 1 μm to 50 μm, more preferably 3 μm to 30 μm, and still more preferably 3 μm to 20 μm. The average fiber diameter of the potassium titanate fibers is preferably 0.01 μm to 1 μm, more preferably 0.05 μm to 0.8 μm, and still more preferably 0.1 μm to 0.7 μm. The average aspect ratio of the potassium titanate fibers is preferably 10 or more, more preferably 10 to 100, and still more preferably 15 to 35. Even marketed products can be used as these fibrous reinforcing materials (D1) and examples that can be used include "TISMO D" (average fiber length: 15 μm, average fiber diameter: 0.5 μm) and "TISMO N" (average fiber length: 15 μm, average fiber diameter: 0.5 μm) both manufactured by Otsuka Chemical Co., Ltd.

Wollastonite fibers are inorganic fibers made of calcium metasilicate. The dimensions of the wollastonite fibers are not particularly limited so long as they are in the above-described ranges of dimensions of the fibrous reinforcing material (D1), but the average fiber length thereof is preferably 5 μm to 180 μm, more preferably 7 μm to 100 μm, and still more preferably 9 μm to 40 μm. The average fiber diameter of the wollastonite fibers is preferably 0.1 μm to 15 μm, more preferably 1 μm to 10 μm, and still more preferably 2 μm to 7 μm. The average aspect ratio of the wollastonite fibers is preferably 3 or more, more preferably 3 to 30, and still more preferably 3 to 15. Even marketed products can be used as these fibrous reinforcing materials (D1) and an example that can be used is "Bistal W" (average fiber length: 25 μm, average fiber diameter: 3 μm) manufactured by Otsuka Chemical Co., Ltd.

The above average fiber length and average fiber diameter can be measured by observation with a scanning electron microscope (SEM), and the average aspect ratio ((average fiber length)/(average fiber diameter)) can be calculated from the average fiber length and the average fiber diameter. For example, a plurality of fibers of the fibrous reinforcing material are taken with a scanning electron microscope (SEM), the images of 300 fibers of the fibrous reinforcing material are arbitrarily selected from the observed images of the plurality of fibers, and their fiber lengths and fiber diameters are measured. Then, the average fiber length can be determined by dividing the sum of all the measured fiber lengths by the number of fibers, and the average fiber diameter can be determined by dividing the sum of all the measured fiber diameters by the number of fibers.

Specific examples of the platy reinforcing material (D2) include mica, sericite, illite, talc, kaolinite, monimorillonite, boehmite, smectite, vermiculite, titanium dioxide, potassium titanate, potassium lithium titanate, potassium magnesium titanate, and boehmite. These types of platy reinforcing materials (D2) may be used singly or in combination of two or more of them. The platy shape as used in the present invention include, in addition to platy shape, flaky shape and scaly shape.

From the viewpoint of further reducing the production of particles, the platy reinforcing material (D2) is preferably particles having a Mohs hardness of not less than 1 and less than 2.5 and is more preferably talc.

Talc is hydrated magnesium silicate in terms of chemical composition, is generally expressed by a chemical formula $4SiO_2 \cdot 3MgO \cdot 2H_2O$, and is normally in the form of flaky particles having a layered structure. Even marketed products can be used as these types of talc.

From the viewpoint of further reducing the production of particles, the average particle diameter of the platy reinforcing material (D2) is preferably 1 µm to 50 µm, more preferably 3 µm to 30 µm, still more preferably 3 µm to 25 µm, and particularly preferably 5 µm to 25 µm.

The average particle diameter of the component (D2) can be measured by the laser diffraction and scattering method. Specifically, the average particle diameter of the component (D2) is a particle diameter at a volume-based cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

In the present invention, the component (D) is preferably a reinforcing material the surface of which is at least partly covered with a treated layer made of a hydrophobic surface treatment agent. The treated layer preferably covers 50% or more of the surface of the reinforcing material and more preferably covers 80% or more of the surface of the reinforcing material. However, the treated layer particularly preferably covers the entire surface of the reinforcing material. Alternatively, as the component (D), use may be made of, without impairing preferred physical properties for the component (D), a mixture of: a reinforcing material the surface of which is at least partly covered with a treated layer made of a hydrophobic surface treatment agent; and an untreated reinforcing material the surface of which is not covered with any hydrophobic surface treatment agent.

Examples of the hydrophobic surface treatment agent include silane coupling agents, titanium coupling agents, and aluminate-based coupling agents. Among them, silane coupling agents are preferred and hydrophobic alkylsilane coupling agents are more preferred.

The hydrophobic silane coupling agent may be any silane coupling agent having: an intrinsically hydrophobic functional group, such as an alkyl group or an aryl group; and a hydrolyzable functional group capable of generating a group reactable with a hydrophilic group in the surface of the reinforcing material. Typical examples of such a hydrophobic alkylsilane coupling agent include alkoxysilanes represented by the general formula (I) below.

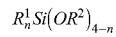

$$R^1_n Si(OR^2)_{4-n} \qquad \text{Formula (I)}$$

In the general formula (I), n represents an arbitrary integer selected from 1 to 3, $R^1$ represents an alkyl group, an alkenyl group or an aryl group, and these groups may have a substituent. In the presence of a plurality of R's, they may be of the same type or different types. $R^2$ represents an alkyl group and may have a substituent. In the presence of a plurality of $R^2$s, they may be of the same type or different types.

Examples of the alkyl group represented by $R^1$ include a heptyl group, an octyl group, a nonyl group, a decyl group, a dodecyl group, a hexadecyl group, an octadecyl group, and an icosyl group. The number of carbon atoms of the alkyl group is preferably 8 or more, and more preferably 10 or more. When the number of carbon atoms of the alkyl group is the above lower limit or more, the mechanical strength, such as shock resistance, of the resultant molded liquid crystal polymer article can be further increased. In addition, the adhesion between molded liquid crystal polymer articles can be further increased. Although much remains unclear about the mechanism that when the number of carbon atoms of the alkyl group is the above lower limit or more, the adhesion between components made of the resultant molded liquid crystal polymer article or the adhesion between a component made of the molded liquid crystal polymer article and other components can be further increased, this can be attributed to acceleration of curing reaction with an adhesive agent, such as epoxy resin, and increase in elongation characteristic of the molded liquid crystal polymer article itself. The upper limit of the number of carbon atoms of the alkyl group is not particularly limited, but can be set at, for example, 20 or less.

The above alkyl groups may have a ring structure or a branched structure. Generally, an alkyl group having a larger number of carbon atoms in the straight chain tends to have a higher degree of hydrophobicity. These alkyl groups may have one to four (preferably one to three and more preferably one) substituents to be described hereinafter at any position.

Example of the alkenyl group represented by $R^1$ include a vinyl group and a butenyl group. These alkenyl groups may have a ring structure or a branched structure. Furthermore, these alkenyl groups may have one to four (preferably one to three and more preferably one) substituents to be described hereinafter at any position.

Example of the aryl group represented by $R^1$ include a phenyl group and a naphthyl group. Furthermore, these aryl groups may have one to four (preferably one to three and more preferably one) substituents to be described hereinafter at any position.

Each of the above-listed groups represented by $R^1$ may have a substituent unless its hydrophobicity is impaired. Examples of the substituent include hydrophobic substituents, such as a fluorine atom and a (meth)acryloxy group.

Furthermore, the alkyl group represented by $R^1$ may have as the hydrophobic substituent any of the above-listed aryl groups. The aryl group represented by $R^r$ may have an alkyl group as the hydrophobic substituent.

Examples of the alkyl group represented by $R^2$ include a methyl group, an ethyl group, a propyl group, a butyl group, a pentyl group, a hexyl group, a heptyl group, an octyl group, a nonyl group, a decyl group, a dodecyl group, a hexadecyl group, an octadecyl group, and an icosyl group. Among them, because an alkoxy group ($OR^2$) in alkoxysilane represented by the general formula (I) is a hydrolyzable group, $R^2$ is, in terms of hydrolyzability, preferably a lower alkyl group with 4 or less carbon atoms, more preferably an ethyl group or a methyl group, and still more preferably a methyl group.

The reference character n represents an arbitrary integer selected from 1 to 3. The reference character n is preferably 1 from the viewpoint of further increasing the reactivity with the particle surfaces of the reinforcing material and the hydrophobicity.

Specific examples of alkoxysilane described above include methyltrimethoxysilane, ethyltrimethoxysilane, hexyltrimethoxysilane, heptyltrimethoxysilane, octyltrimethoxysilane, nonyltrimethoxysilane, decyltrimethoxysilane, dodecyltrimethoxysilane, hexadecyltrimethoxysilane, octadecyltrimethoxysilane, icosyltrimethoxysilane, phenyltrimethoxysilane, methyltriethoxysilane, ethyltriethoxysilane, hexyltriethoxysilane, heptyltriethoxysilane, octyltriethoxysilane, nonyltriethoxysilane, decyltriethoxysilane, dodecyltriethoxysilane, hexadecyltriethoxysilane, octadecyltriethoxysilane, icosyltriethoxysilane, and phenyltriethoxysilane. These alkoxysilanes can be used singly or in combination of two or more of them.

In the present invention, the degree of hydrophobicity of the surface treatment agent can be expressed by treating the surface of a glass plate with the surface treatment agent and determining the surface free energy of the treated surface. In the present invention, the surface free energy can be determined by uniformly applying to the glass plate a surface treatment agent diluted 10 times with methanol, heating the glass plate at 85° C. for an hour, then subjecting the glass plate to a heat treatment at 110° C. for an hour, then measuring the static contact angles of two liquids, water and decane, on the glass plate surface to which the surface treatment agent is applied, and calculating the surface free energy from the static contact angles. For example, the surface free energy of decyltrimethoxysilane is 28 mN/m, the surface free energy of γ-glycidoxypropyltrimethoxysilane is 55 mN/m, and the surface free energy of 3-aminopropyltriethoxysilane is 68 mN/m.

The type of the surface treatment agent for use in the present invention is not particularly limited, but the preferred surface treatment agents are those having good thermal stability in terms of temperature during molding process of the liquid crystal polymer, having physical and chemical stabilities, and having a surface free energy of 50 mN/m or less when a glass plate is uniformly treated with them. The lower limit of the surface free energy is not particularly limited, but is preferably 1 mN/m. Even with the use of any surface treatment agent having a surface free energy of over 50 mN/m, the surface free energy may be brought down to 50 mN/m or less by mixing two or more types of surface treatment agents.

If the surface free energy of the surface treatment agent is over 50 mN/m, it is higher than that of the liquid crystal polymer (A), which may make it impossible to control metal ions eluted, because of failure of the reinforcing material (D) during kneading or molding process, from the failure surface and may accelerate hydrolysis of the liquid crystal polymer (A). Therefore, the liquid crystal polymer (A) is preferably filled with a reinforcing material (D) prepared to have a surface free energy in a range of 50 mN/m or less.

Furthermore, the oil absorption of the reinforcing material (D) after being subjected to surface treatment is preferably 130 ml/100 g or less, and more preferably 80 ml/100 g to 130 ml/00 g.

If the oil absorption is over 130 ml/100 g. the compatibility of the reinforcing material (D) with the liquid crystal polymer (A) extremely decreases, which may cause a problem that the productivity significantly decreases and also a problem that the amount of filling of surface-treated reinforcing material (D) cannot be increased.

The oil absorption of the reinforcing material (D) after being surface-treated can be measured using the refined linseed oil method [JIS K 5101-13-1].

In relation to a method for subjecting the reinforcing material (D) to surface treatment in the present invention, there are known a dry method and a wet method as a method for previously treating the surfaces of the reinforcing material (D) with a coupling agent and both the methods can be used in the present invention. In doing so, the concentration of the surface treatment is, relative to 100% by mass of the reinforcing material (D), preferably 0.1% by mass to 3.0% by mass and more preferably 0.5% by mass to 1.5% by mass.

Known surface treatment methods can be used as the method for forming a treated layer made of a surface treatment agent on the surface of the component (D). The surface treatment is performed, for example, by a dry method of loading the reinforcing material into an apparatus capable of stirring at high speed, such as a Henschel mixer, and spraying on the reinforcing material being stirred the surface treatment agent (in liquid form) or a solution obtained by dissolving the surface treatment agent in a solvent promoting hydrolysis (for example, water, an alcohol or a mixed solvent of them).

In treating the surface of the reinforcing material (D) for use in the present invention with the surface treatment agent, the amount of surface treatment agent is not particularly limited, but, in the dry method, the solution of the surface treatment agent may be sprayed so that the amount of surface treatment agent reaches, relative to 100 parts by mass of the reinforcing material (D), for example, preferably 0.1 parts by mass to 20 parts by mass, more preferably 0.1 parts by mass to 10 parts by mass, still more preferably 0.3 parts by mass to 5 parts by mass, yet still more preferably 0.5 parts by mass to 3 parts by mass, and particularly preferably 0.8 parts by mass to 1.2 parts by mass.

By defining the amount of surface treatment agent within the above ranges, the adhesion of the reinforcing material to the component (A) can be further increased.

As for the component (D) in the liquid crystal polymer composition according to the present invention, the particle size is not particularly limited. However, from the viewpoint that when the liquid crystal polymer composition is used as a member for a camera module, the production of particles can be further reduced, the component (D) preferably contains both the fibrous reinforcing material (D1) and the platy reinforcing material (D2) and more preferably contains both a fibrous reinforcing material (D1) having a Mohs hardness of not less than 2.5 and not more than 5 and a platy reinforcing material (D2) having a Mobs hardness of not less than 1 and less than 2.5. In this case, at least one of the respective surfaces of the fibrous reinforcing material (D1) and the platy reinforcing material (D2) is sufficient to be at least partly covered with a treated layer made of a hydrophobic surface treatment agent. From the view point of further reducing the particles of the member for a camera module, it is preferred that both the surfaces of the fibrous reinforcing material (D1) and the platy reinforcing material (D2) are each at least partly covered with a treated layer made of a hydrophobic surface treatment agent.

The content of the component (D) in the liquid crystal polymer composition according to the present invention is, in a total amount of 100% by mass of the liquid crystal polymer composition, preferably 0.1% by mass to 40% by mass, more preferably 5% by mass to 35% by mass, and still more preferably 10% by mass to 30% by mass.

By defining the content of the component (D) within the range of 0.1% by mass to 40% by mass, the production of particles when the liquid crystal polymer composition is used as a member for a camera module can be further suppressed.

As for the component (D) in the liquid crystal polymer composition according to the present invention, the mass ratio of the platy reinforcing material (D2) to the fibrous reinforcing material (D1), i.e., the platy reinforcing material (D2)/fibrous reinforcing material (D1) is preferably 0 to 1, more preferably 0.01 to 0.8, still more preferably 0.1 to 0.7, and particularly preferably 0.2 to 0.6. By defining the mass ratio of the platy reinforcing material (D2) to the fibrous reinforcing material (D1) within the range of 0 to 1, the production of particles can be further suppressed.

(Particulate Carbon Material (E))

The liquid crystal polymer composition according to the present invention may contain, as necessary, a particulate carbon material (E). The type of the particulate carbon material (E) (hereinafter, also referred to as a "component (E)") is not particularly limited. For example, commonly available particulate carbon materials for use for the purpose of ensuring the light-blocking properties of a molded liquid crystal polymer article, such as a component for camera module use, and for use in coloring resin can be preferably used.

Examples of the particulate carbon material (E) that can be used include: graphite; carbon blacks, such as acetylene black, furnace black, lamp black, thermal black, channel black, roller black, and disc black; carbon nanotube; and carbon fibril. From the viewpoint of further increasing the light-blocking properties of the molded liquid crystal polymer article molded from the liquid crystal polymer composition according to the present invention, the particulate carbon material (E) is preferably carbon black. These types of particulate carbon materials (E) may be used singly or in combination of two or more of them.

In the present invention, the primary particle diameter of the particulate carbon material (E) is preferably not less than 10 nm and not mon than 100 nm.

When the primary particle diameter of the particulate carbon material (E) is not less than 10 nm and not more than 100 nm, the particulate carbon material (E) can be easily dispersed, in producing a liquid crystal polymer composition according to the present invention or a molded liquid crystal polymer article molded from the liquid crystal polymer composition according to the present invention, into the liquid crystal polymer composition. In addition, the molded liquid crystal polymer article molded from the liquid crystal polymer composition according to the present invention can be given a sufficiently low surface resistance, which enables further reduction of the increase in the amount of electric charge in the molded liquid crystal polymer article. In the molded liquid crystal polymer article obtained in the above manner, the in-plane surface resistance of the molded liquid crystal polymer article can be easily made uniform. As a result, the increase in amount of electric charge can be reduced everywhere in the plane of the molded liquid crystal polymer article. The primary particle diameter of the particulate carbon material (E) is preferably not less than 15 nm and not more than 85 nm, and more preferably not less than 20 am and not more than 75 nm.

In the present invention, an arithmetic average particle diameter (number average), which is an average value of primary particle diameters measured by a transmission electron microscope, can be adopted as the primary particle diameter of the particulate carbon material (E).

In the present invention, the DBP oil absorption of the particulate carbon material (E) is preferably not less than 90 cm$^3$/100 g and preferably not more than 550 cm$^3$/100 g.

A higher DBP oil absorption of the particulate carbon material (E) means a larger number of voids present in the vicinity of the surfaces of the particulate carbon material (E). When the number of voids in the vicinity of the surfaces of the particulate carbon material (E) is large, particles of the particulate carbon material (E) are likely to be engaged with and connected to each other in the liquid crystal polymer composition.

When the DBP oil absorption of the particulate carbon material (E) is not less than 90 cm$^3$/100 g, the molded liquid crystal polymer article molded from the liquid crystal polymer composition is likely to sufficiently conduct electricity at the connected portions of the particulate carbon material (E). As a result, the surface resistance of the molded article can be more sufficiently lowered. Hence, the increase in the amount of electric charge in the molded article can be more sufficiently reduced. However, if the DBP oil absorption of the particulate carbon material (E) is excessively high, the umber of voids in the vicinity of the surfaces of the particulate carbon material (E) is excessively large, which makes it likely that particles of the particulate carbon material (E) are strongly engaged with each other in the liquid crystal polymer composition. In melt-kneading the liquid crystal polymer (A), the reinforcing material (D), the particulate carbon material (E), and additives to be added if desired, the melt viscosity of the mixture of them may become high. As a result, the mixture may be difficult to knead, which makes it difficult to produce the liquid crystal polymer composition. When the DBP oil absorption of the particulate carbon material (E) is not more than 550 cm$^3$/100 g. a mixture of the liquid crystal polymer (A), the reinforcing material (D), the particulate carbon material (E), and additives to be added if desired can be prevented from reaching an excessively high viscosity in melt-kneading the mixture. As a result, the mixture can be easily granulated, which makes it easier to produce the liquid crystal polymer composition according to the present invention. The DBP oil absorption of the particulate carbon material (E) is preferably not less than 90 cm$^3$/100 g, more preferably not less than 92 cm$^3$/100 g, preferably not more than 550 cm$^3$/100 g, and more preferably not more than 525 cm$^3$/100 g.

In the present invention, the value obtained by measurement in conformity with JIS K 6221 using dibutyl phthalate absorbed meter can be adopted as the DBP oil absorption.

In the present invention, the BET specific surface area of the particulate carbon material (E) is preferably not less than 30 m$^2$/g and not more than 1500 m$^2$/g, more preferably not less than 40 m$^2$/g and not more than 1350 m$^2$/g, and still more preferably not less than 45 m$^2$/g and not more than 1300 m$^2$/g.

In the present invention, the value adopted as the BET specific surface area is the value obtained by using a BET specific surface area measuring instrument to adsorb nitrogen gas thereon at the liquid nitrogen temperature and measure the amount of nitrogen gas adsorbed, and calculating, by the BET method, the BET specific surface area from the amount of nitrogen gas adsorbed. An example of the BET specific surface area measuring instrument that can be used is AccuSorb 2100E manufactured by Micromeritics Instrument Corporation.

When the BET specific surface area of the particulate carbon material (E) is the above lower limit or more, the molded liquid crystal polymer article molded from the liquid crystal polymer composition according to the present invention is likely to sufficiently conduct electricity at the connected portions of the particulate carbon material (E). As a result, the surface resistance of the molded liquid crystal polymer article can be further lowered. Hence, the increase in the amount of electric charge in the molded product can be further reduced.

When, in producing the liquid crystal polymer composition according to the present invention and its molded product, the BET specific surface area of the particulate carbon material (E) is the above upper limit or less, a mixture of the liquid crystal polymer (A), the reinforcing material (D), the particulate carbon material (E), and additives to be added if desired can be prevented from reaching an excessively high melt viscosity in melt-kneading the mixture. As a result, the mixture can be more easily kneaded, which makes it easier to produce the liquid crystal polymer composition according to the present invention.

The content of the component (E) in the liquid crystal polymer composition according to the present invention is, in a total amount of 100% by mass of the liquid crystal polymer composition, preferably in a range of 0.1% by mass to 5.0% by mass, more preferably 0.5% by mass to 4.5% by mass, and still more preferably 0.8% by mass to 4.0% by mass. If the content of the component (E) is excessively small, the resulting liquid crystal polymer composition may be low in jet-blackness and, therefore, may not be able to sufficiently ensure the light-blocking properties.

If the content of the component (E) is excessively large, agglomerates (agglomerated bunches of small protrusions of the particulate carbon material (E)) are suspended in a resin made of a melted, low-viscosity liquid crystal polymer during melt-kneading, which makes the liquid crystal polymer composition difficult to be subjected to shear during kneading and makes it likely that a dispersion failure occurs. Therefore, stress is focused on the agglomerates and the agglomerates may be the origin of fracture, which may significantly deteriorate the mechanical strength of the molded liquid crystal polymer article and make it difficult to achieve the original purpose.

When the content of the component (E) is in the range of 0.1% by mass to 5.0% by mass, the dispersibility of the component (E) in the liquid crystal polymer composition can be increased and, thus, the resulting molded liquid crystal polymer article can be further increased in thermal resistance, light-blocking properties, and mechanical strength, particularly, shock resistance properties.

(Fluorine-Contained Resin (F))

The liquid crystal polymer composition according to the present invention may contain, as necessary, a fluorine-contained resin (F) (hereinafter, also referred to as a "component (F)"). The component (F) is a polymer having repeating units of —($CF_2$—$CF_2$)— and, for example, a modified polytetrafluoroethylene resin into which a perfluoroalkyl ether group —($C_pF_{2p}$—O)— (where p is an integer of 1 to 4) is introduced can be used.

The component (F) may be obtained using the suspension polymerization method for obtaining general molding powder or the emulsion polymerization method for obtaining fine powder. Alternatively, the component (F) may be a polytetrafluoroethylene resin converted from a high-molecular-weight polytetrafluoroethylene resin to a low-molecular-weight form by thermal decomposition or radiation.

The component (F) is preferably in powdered form and its average particle diameter is preferably 0.1 µm to 100 µm, more preferably 1 µm to 50 µm, and still more preferably 5 µm to 20 µm. By defining the average particle diameter within the above range, the coefficient of friction during sliding can be further reduced. The average particle diameter of the component (F) can be measured by the laser diffraction and scattering method and is a particle diameter at a volume-based cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The particle shape of the component (F) that can be used is not particularly limited so long as the component (F) is non-fibrous particles, such as spherical, prismoidal, platy, rodlike, columnar, blocky or amorphous particles. The particle shape of the component (F) can be analyzed, for example, by observation with a scanning electron microscope (SEM).

Fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e., B>T). The length L and the breadth B correspond to the fiber length and the fiber diameter, respectively. The fibrous particles preferably have an L/B of 5 or more and an L/T of 5 or more. The non-fibrous particles refer to particles having an L/B of less than 3 and, among these non-fibrous particles, those having an L/B of less than 3 and an L/T of 3 or more are referred to as platy particles.

Polytetrafluoroethylene resin (hereinafter, also referred to as "PTFE") is classified as a thermoplastic resin, but generally has an abnormally high melt viscosity and therefore cannot be injection molded. For this reason, a molded article of a resin composition containing PTFE as a major ingredient is produced by a method of compressing a mixed powder of resins and heating it to a melting point or higher to fuse the powder particles together (compression molding). PTFE for use in compression molding is high-molecular-weight one. However, if high-molecular-weight PTFE is blended and melt mixed with a general thermoplastic resin, the resin composition becomes less flowable owing to fibrillation or agglomeration of PTFE and therefore can neither be melt mixed nor injection molded. For this reason, PTFE for use as a solid lubricant for an injection-molding thermoplastic resin is low-molecular-weight PTFE. Furthermore, the liquid crystal polymer is generally melt mixed at a temperature around the melting point of PTFE and has a low viscosity during melting. Therefore, if the molecular weight of PTFE to be blended and melt mixed is too high, its particles may agglomerate.

The molecular weight and melt viscosity of PTFE are correlated with each other. Therefore, as for PTFE for use as the component (F), its MFR value measured under conditions at a temperature of 372° C. and a load of 5 kg is preferably 5 g/10 min or more, more preferably 10 g/10 min or more, and still more preferably more than 35 g/10 min. The MFR value of the component (F) can be measured in conformity with JIS K 7210.

PTFE may be fired in order to suppress fibrillation and agglomeration. The melting point of a fired body thereof is 320° C. to 330° C. and the melting point of an unfired body thereof is 330° C. to 350° C., although they slightly vary depending on the molecular weight. Therefore, the firing degree can be estimated by observing the melting point. From the viewpoint of further suppressing agglomeration during molding, the melting point of the component (F) is preferably lower than 330° C. and its lower limit is preferably 320° C. The melting point of PTFE can be measured in conformity with JIS K 7121.

The content of the component (F) in the liquid crystal polymer composition according to the present invention is, in a total amount of 100% by mass of the liquid crystal polymer composition, preferably 0.1% by mass to 30% by mass, more preferably 0.5% by mass to 20% by mass, still more preferably 1.0% by mass to 18% by mass, and particularly preferably 1.5% by mass to 15% by mass. By defining the content of the component (F) within the range of 0.1% by mass to 30% by mass, the sliding properties can be further increased.

<Other Additives of Liquid Crystal Polymer Composition>
(Solid Lubricant)

The liquid crystal polymer composition according to the present invention may contain a solid lubricant without impairing its preferred physical properties. Examples of the solid lubricant include low-density polyethylene, linear low-density polyethylene, medium-density polyethylene, high-density polyethylene, ultra-high molecular weight polyethylene or other polyolefin resins, silicone resin, graphite, molybdenum disulfide, tungsten disulfide, boron nitride, polytetrafluoroethylene resin which is a polymer having repeating units of —($CF_2$—$CF_2$)—, and a modified polytetrafluoroethylene resin into which a perfluoroalkyl ether group —($C_pF_{2p}$—O)— (where p is an integer of 1 to 4) or the like is introduced. At least one of these solid lubricants may be blended into the liquid crystal polymer composition. The content of the solid lubricant in the liquid crystal polymer composition according to the present invention is, in a total amount of 100% by mass of the liquid crystal polymer composition, preferably 0.5% by mass to 20% by mass and more preferably 1% by mass to 15% by mass.

(Other Additives)

The liquid crystal polymer composition according to the present invention may contain other additives without impairing its preferred physical properties. Examples of the other additives include: an inorganic filler except for barium sulfate (C) and the reinforcing material (D) (for example, calcium carbonate, mica, sericite, illite, kaolinite, montmorillonite, boehmite, smectite, vermiculite, palygorskite, pyrophyllite, halloysite, diatomite, titanium dioxide); a laser direct structuring additive (for example, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$ or $MgCr_2O_4$); a conductive filler except for the particulate carbon material (E) (for example, metallic particles (for example, aluminum flake), metallic fibers, metal oxide particles, carbon fibers, ionic liquid or surfactant); an antistat (for example, anionic antistat, cationic antistat or non-ionic antistat); an antioxidant and a thermal stabilizer (for example, hindered phenol, hydroquinone, phosphite, thioether or substitutions of these substances); a ultraviolet ray absorber (for example, resorcinol, salicylate, benzotriazole, benzophenone or triazine); a light stabilizer (for example, hindered phenol or hindered amine); a weatherproofer; a light-resistant agent; a mold release agent (for example, higher fatty acid, higher fatty acid ester, higher fatty acid amide, metal salt of higher fatty acid (higher fatty acid used herein refers to fatty acid with 10 to 25 carbon atoms), fatty acid or metal salt of fatty acid); a lubricant; a flow modifier; a plasticizer (for example, polyester-based plasticizer, glycerin-based plasticizer, polycarboxylic acid ester-based plasticizer, phosphoric acid ester-based plasticizer, polyalkylene glycol-based plasticizer or epoxy-based plasticizer); an impact resistance improver; a flame retardant (for example, phosphazene-based compound, phosphoric acid ester, condensed phosphoric acid ester, inorganic phosphorous flame retardant, halogen-based flame retardant, silicone-based flame retardant, metal oxide-based flame retardant, metal hydroxide-based flame retardant, organometallic salt-based flame retardant, nitrogen-based flame retardant or boron compound-based flame retardant); an antidripping agent; a nucleating agent; a dispersant; a sound deadener; a neutralizer; and an anti-blocking agent. The liquid crystal polymer composition may contain at least one of these additives.

From the viewpoint that a molded article having more excellent adhesion to an adhesive agent, such as epoxy resin, and further reducing the production of particles can be obtained, the liquid crystal polymer composition according to the present invention preferably contains a thermal stabilizer and/or a light stabilizer, more preferably contains, among the above-listed thermal stabilizers and light stabilizers, at least one compound selected from the group consisting of hindered phenol, hindered amine, and thioether, and still more preferably contains at least one compound selected from the group consisting of hindered phenol and hindered amine. The above compound preferably contains an amide group and/or an amino group from the viewpoint that a molded article having still more excellent adhesion to an adhesive agent, such as epoxy resin, can be obtained.

In the case where the liquid crystal polymer composition according to the present invention contains the other additives, the content of them is not particularly limited unless it impairs the preferred physical properties of the liquid crystal polymer composition. The content of the other additives is, in a total amount of 100% by mass of the liquid crystal polymer composition, preferably 10% by mass or less and more preferably 5% by mass or less.

<Production Method of Liquid Crystal Polymer Composition>

A liquid crystal polymer composition according to the present invention can be produced by heating and mixing (particularly, melt-kneading) a mixture containing a liquid crystal polymer (A), a semi-aromatic polyamide resin (B), and barium sulfate (C) and further containing, as necessary, a reinforcing material (D), a particulate carbon material (E), a fluorine-contained resin (F), a solid lubricant, and other additives.

For melt-kneading, any known melt kneader, for example, a biaxial extruder, can be used. Specifically, the liquid crystal polymer composition can be produced by: (1) a method of preliminarily mixing the above components with a mixer (such as a tumbler or a Henschel mixer), melt-kneading the mixture with a melt kneader, and then pelletizing it with a pelletization device (such as a pelletizer); (2)

a method of controlling a master batch of desired components, mixing it with other components as necessary, and melt-kneading the mixture into pellets with a melt kneader; (3) a method of feeding the components into a melt kneader to form pellets; or other methods.

The processing temperature during melt-kneading is not particularly limited so long as it is within a temperature range in which the liquid crystal polymer (A) can melt. Normally, the cylinder temperature of a melt kneader for use in the melt-kneading is adjusted within this range. In the manner thus described, the liquid crystal polymer composition according to the present invention that can exhibit desired effects is produced.

<Production Method and Use of Molded Liquid Crystal Polymer Article>

The liquid crystal polymer composition according to the present invention can be produced into a molded liquid crystal polymer article by molding it according to a known resin molding method, such as injection molding, insert molding, compression molding, blow molding or inflation molding depending on the type, use, shape, and others of a desired molded liquid crystal polymer article. The molding method is preferably injection molding or insert molding. Alternatively, a molding method composed of any combination of the above molding methods may be adopted. A molded liquid crystal polymer article obtained by molding the liquid crystal polymer composition according to the present invention can improve the adhesion between components for use in precision equipment and between components for use as electronic components. Furthermore, as to a molded liquid crystal polymer article obtained by molding the liquid crystal polymer composition according to the present invention, when the above-described constituent components for the liquid crystal polymer composition are appropriately incorporated into the unmolded composition, the molded liquid crystal polymer article can have excellent mechanical strength and light-blocking properties and suppress particles possibly produced upon impact or fall.

The molded liquid crystal polymer article molded using the liquid crystal polymer composition according to the present invention is suitably used as a member for use in producing electronic components of precision equipment. The molded liquid crystal polymer article is suitably used for production of a component including the molded liquid crystal polymer article and examples of the component include electronic components for sliding members sliding on other members, for example, components constituting one selected from the group consisting of a connector, an antenna, a switch, a relay, and a camera module. The liquid crystal polymer molded article according to the present invention is suitably used for production of, among the above electronic components, particularly electronic optical components (components for a camera module) being constituents of a camera module because it can be expected to prevent the deterioration in optical properties due to fibrillation of the surface of the liquid crystal polymer molded article. Examples of electronic optical components being constituents of a camera module include a lens barrel (a portion on which a lens is mounted), a spacer, a mount holder (a portion on which the barrel is attached and which is fixed to a substrate), a base, a lens tube, a frame of a CMOS (an image sensor), a shutter, a shutter plate, a shutter body, an aperture ring, and a stopper (a portion holding a lens).

The molded liquid crystal polymer article according to the present invention can be used in electrical and electronic equipment having a camera function. Particularly, the molded liquid crystal polymer article according to the present invention can be suitably used in a smartphone or a tablet terminal having a camera function.

EXAMPLES

Hereinafter, a detailed description will be given of the present invention with reference to working examples and comparative examples, but the present invention is not at all limited to these examples. Specific raw materials used in the working examples and comparative examples are as follows.

(Liquid Crystal Polymer (A))
  Liquid crystal polymer: wholly aromatic type I, melt viscosity of $2.0 \times 10^4$ mPa·s (at a measurement temperature of 350° C.), melting point of 320° C., trade name "UENO LCP A-6000" manufactured by Ueno Fine Chemicals Industry, Ltd.

(Semi-Aromatic Polyamide Resin (B))
  Semi-aromatic polyamide: melt viscosity of $7.0 \times 10^4$ mPa·s (at a measurement temperature of 330° C. and a shear rate of 1200 l/s), melting point of 312° C., trade name "VYLOAMIDE MJ-760" manufactured by Toyobo Co., Ltd.

(Semicrystalline Polyester Resin)
  Polyethylene terephthalate: PBT, melt viscosity of $11.9 \times 10^4$ mPa·s (at a measurement temperature of 250° C. and a shear rate of 1200 l/s), melting point of 224° C., trade name "Toraycon 1100S" manufactured by Toray Industries, Inc.
  Polyethylene terephthalate: PET, melt viscosity of $1.7 \times 10^4$ mPa·s (at a measurement temperature of 280° C. and a shear rate of 1200 l/s), melting point of 257° C., trade name "TRN-MTJ" manufactured by Teijin Limited.
  Polycyclohexylenedimethylene terephthalate: PCT, melt viscosity of $5.3 \times 10^4$ mPa·s (at a measurement temperature of 300° C. and a shear rate of 1200 l/s), melting point of 290° C., trade name "PURATAN SKYPURA 0302HC" manufactured by SK Chemicals Co., Ltd.

(Barium Sulfate (C))
  Precipitated barium sulfate: average particle diameter of 0.28 µm, trade name "Precipitated Barium Sulfate B-31" manufactured by Sakai Chemical Industry Co., Ltd.

(Reinforcing Material (D))
<Fibrous Reinforcing Material (D1)>
  Untreated wollastonite fibers: average fiber length of 9.3 µm, average fiber diameter of 2.4 µm, aspect ratio of 3.9
  Untreated potassium titanate fibers: average fiber length of 15 µm, average fiber diameter of 0.5 µm, aspect ratio of 30, potassium hexatitanate fibers
<Platy Reinforcing Material (D2)>
  Untreated talc: average particle diameter of 19 µm, trade name "RG319" manufactured by Fuji Talc Industrial Co., Ltd.

(Particulate Carbon Material (E))
  Carbon black: primary particle diameter of 50 nm, BET specific surface area of 50 m²/g, DBP oil absorption of 175 cm³/100 g, trade name "#3050B" manufactured by Mitsubishi Chemical Corporation (Fluorine-Contained Resin (F))
  Polytetrafluoroethylene resin (PTFE): average particle diameter of 8 µm, MFR value of 50 g/10 min or more, melting point of 324° C., trade name "PTFE TF-9205" manufactured by 3M (Measurement of Melt Viscosity)

The melt viscosity of the liquid crystal polymer (A) was measured with a melt viscosity measurement device (trade name "Capilograph 1D" manufactured by Toyo Seiki Seisaku-sho, Ltd.) using an orifice with 1.0 mm in diameter and 10 mm in length under conditions at a temperature 30° C. higher than the melting point of the liquid crystal polymer (A) and a shear rate of $1.0 \times 10^3$ sec$^{-1}$.

The melt viscosity of the semi-aromatic polyamide resin (B) was measured with a melt viscosity measurement device (trade name "Capilograph 1D" manufactured by Toyo Seiki Seisaku-sho, Ltd.) using an orifice with 1.0 mm in diameter and 10 mm in length under conditions at a temperature 18° C. higher than the melting point of the semi-aromatic polyamide resin (B) and a shear rate of $1.2 \times 10^3$ sec$^{-1}$.

(Measurement of Melting Point)

The melting point of the liquid crystal polymer (A) was measured with a differential calorimeter (trade name "DSC7000X" manufactured by Hitachi High-Tech Science Corporation) in conformity with JIS K 7121. Specifically, the melting point was measured by putting 10 mg of sample into a measurement aluminum cell, increasing the temperature from room temperature to 50° C. at a rate of temperature increase of 10° C./min under conditions at a nitrogen flow rate of 100 ml/min, holding the temperature at 50° C. for five minutes, and then increasing the temperature to 400° C. at a rate of temperature increase of 10° C./min.

The melting point of the semi-aromatic polyamide resin (B) was measured with a differential calorimeter (trade name "DSC7000X" manufactured by Hitachi High-Tech Science Corporation) in conformity with JIS K 7121. Specifically, the melting point was measured by putting 10 mg of sample into a measurement aluminum cell, increasing the temperature from room temperature to 50° C. at a rate of temperature increase of 10° C./min under conditions at a nitrogen flow rate of 100 ml/min, holding the temperature at 50° C. for five minutes, and then increasing the temperature to 400° C. at a rate of temperature increase of 10° C./min.

The melting point of the fluorine-contained resin (F) was measured with a differential calorimeter (trade name "DSC7000X" manufactured by Hitachi High-Tech Science Corporation) in conformity with JIS K 7121. Specifically, the melting point was measured by putting 10 mg of sample into a measurement aluminum cell, increasing the temperature from room temperature to 50° C. at a rate of temperature increase of 10° C./min under conditions at a nitrogen flow rate of 100 ml/min, holding the temperature at 50° C. for five minutes, and then increasing the temperature to 400° C. at a rate of temperature increase of 10° C./min.

(Measurement of MFR Value)

The MFR value of the fluorine-contained resin (F) was measured under conditions at a temperature of 372° C. and a load of 5 kg for a residence time of five minutes in conformity with JIS K 7210.

(Average Particle Diameters of Barium Sulfate (C), Platy Reinforcing Material (D2), and Fluorine-Contained Resin (F))

The average particle diameters were measured with a laser diffraction particle size distribution measurement device (trade name "SALD-2100" manufactured by Shimadzu Corporation).

(Average Fiber Length, Average Fiber Diameter, and Aspect Ratio of Fibrous Reinforcing Material (D1))

Each of the average fiber length, average fiber diameter, and aspect ratio of the fibrous reinforcing material (D1) was determined from the average value of arbitrary 1000 fibers measured by observation with a scanning electron microscope (SEM).

(Physical Properties of Particulate Carbon Material (E))

The primary particle diameter of carbon black was determined from an arithmetic average particle diameter (number average) which is an average value of primary particle diameters measured by a transmission electron microscope (product number "JEM2010" manufactured by JEOL Ltd.). The DBP oil absorption was measured with a dibutyl phthalate absorbed meter in conformity with JIS K 6221. The BET specific surface area was measured in conformity with JIS K 6217.

Synthetic Example 1

Untreated wollastonite fibers were loaded into a Henschel mixer and subjected to surface treatment by the dry method so that the wollastonite fibers were treated with 1.0% by mass octyltriethoxysilane relative to the untreated wollastonite fibers, thus preparing surface-treated wollastonite fibers (a fibrous reinforcing material (D1)), and the surface-treated wollastonite fibers were confirmed to have the same average fiber length, the same average fiber diameter, and the same aspect ratio as those untreated.

Synthetic Example 2

Surface-treated talc (a platy reinforcing material (D2)) was prepared in the same manner as in Synthetic Example 1 except that the untreated wollastonite fibers were replaced with untreated talc, and confined to have the same average particle diameter as the untreated talc.

Synthetic Example 3

Surface-treated potassium titanate fibers (a fibrous reinforcing material (D1)) were prepared in the same manner as in Synthetic Example 1 except that the untreated wollastonite fibers were replaced with untreated potassium titanate fibers, and confirmed to have the same average fiber length, the same average fiber diameter, and the same aspect ratio as those untreated.

<Production of Liquid Crystal Polymer Composition and Molded Liquid Crystal Polymer Article>

Examples 1 to 15 and Comparative Examples 1 to 5

Each liquid crystal polymer composition was melt-kneaded in the composition ratio shown in Tables 1 and 2 using a biaxial extruder, thus producing pellets. In Tables 1 and 2, the respective reinforcing materials obtained by surface-treating the untreated materials in Synthetic Examples 1, 2, and 3 are listed as Surface-treated wollastonite fibers, Surface-treated talc, and Surface-treated potassium titanate fibers, respectively. The untreated materials before being surface-treated are listed as Untreated wollastonite fibers, Untreated talc, and Untreated potassium titanate fibers. The cylinder temperature of the biaxial extruder was 340° C.

The obtained pellets were molded, with an injection molder, into flat sheets 1 (with 90 mm in height, 50 mm in width, and 3 mm in thickness), flat sheets 2 (with 126 mm in height, 13 mm in width, and 1.6 mm in thickness), JIS test specimens for use in measuring mechanical properties, flat sheets 3 (with 110 mm in height, 10 mm in width, and 4 mm in thickness), and flat sheets 4 (with 64 mm in height, 13 mm in width, and 4 mm in thickness), thus obtaining evaluation samples (molded liquid crystal polymer articles). The cylinder temperature of the injection molder was 340° C. and the molding tool temperature thereof was 130° C.

<Evaluations>

(Hunter Brightness)

The Hunter brightness of each of the freshly molded flat sheets 1 was measured with a colorimeter (trade name "ZE 6000", manufactured by Nippon Denshoku Industries Co., Ltd.). The results are shown in Tables 1 and 2.

(Tensile Strength)

The samples were measured in terms of tensile strength with a tester Autograph AG-5000 (manufactured by Shimadzu Corporation) in conformity with JIS K 7162. The results are shown in Tables 1 and 2.

(Bending Strength and Bending Modulus of Elasticity)

The samples were subjected to a 60 mm-span three-point bending test with a tester Autograph AG-5000 (manufactured by Shimadzu Corporation) in conformity with JIS K 7171 to measure their bending strengths and bending moduli of elasticity. The results are shown in Tables 1 and 2.

(Notched IZOD Impact Value)

The samples were measured in terms of notched IZOD impact value in conformity with JIS K 7110. The results are shown in Tables 1 and 2.

(Melt Viscosity)

The melt viscosities of the liquid crystal polymer compositions shown in Tables 1 and 2 were measured with a melt viscosity measurement device (trade name "Capilograph 1D" manufactured by Toyo Seiki Seisaku-sho, Ltd.) using a capillary rheometer with 1.0 mm in diameter and 10 mm in length under conditions at a temperature 330° C. and a shear rate of 6080 sec$^{-1}$.

(Mold Shrinkage)

The respective longitudinal dimensions of the JIS test specimens for tensile test measurements were accurately measured with a micrometer and the percentage of difference of the longitudinal dimension of each JIS test specimen from the associated dimension of the molding tool was referred to as the mold shrinkage (%). Specifically, the mold shrinkage (%) was calculated according to the formula (II).

Mold shrinkage (%) =

$[((\text{tool dimension}) - (\text{molded article dimension}))/(\text{tool dimension})] \times 100$ Formula (II)

The results are shown in Tables 1 and 2.

(Deflection Temperature Under Load)

The samples were subjected to the edgewise test with an HDT measurement device (trade name "HDT. VSPT. TESTER S-3M" manufactured by Toyo Seiki Seisaku-sho, Ltd.) in conformity with the JIS K 7191A method to measure their deflection temperatures (° C.) under load. The deflection temperature under load was measured under test conditions where each of the flat sheets 3 produced as described previously was used as test specimen for deflection temperature under load. The deflection temperature (° C.) under load of each test specimen was determined in conformity with the JIS K 7191A method. The start temperature was 50° C., the rate of temperature increase was 120° C./h, the load was 1.8 MPa, the span was 100 mm. The results are shown in Tables 1 and 2.

(Amount of Particles Produced)

Each of the flat sheets 4 was measured in weight with a precision balance (product number "GR-200" manufactured by A&D Company, Limited), then placed in a reciprocating sliding tester (evaluation device: TK-1 manufactured by Talk System Co., Ltd.), and slid on a counter member of liquid crystal polyester resin (having a Rockwell hardness HRM of 53) 200 reciprocations at a travel distance of 20 mm, a load of 5 N, and a velocity of 40 mms. After the end of sliding, particles adhering to the flat sheet 4 were removed by air and the flat sheet 4 was then measured in weight with a precision balance (product number "GR-200" manufactured by A&D Company, Limited). The difference in weight of each flat sheet 4 between before and after the test was calculated as the amount of particles produced. The results are shown in Table 1.

(Measurement of Tensile Adhesion Force)

Each of the flat plates 2 was dried in a forced convection oven under conditions at 120° C. for 60 minutes. After the drying, a portion of the test specimen to be tested was wiped with a solvent to degrease the test specimen well. An adhesive agent (low-elasticity, fast-curing epoxy adhesive agent, product number "AE-740", manufactured by Ajinomoto Fine-Techno Co., Inc.) was applied to a portion of the test specimen (a surface portion thereof to be attached to the molding tool) 15 mm distant from a distal end thereof located on the opposite side to the mold gate, surface portions of 15 mm length to be attached to the molding tool were overlapped and bonded together, fixed by a clip, and cured for 60 minutes in this state in an oven previously conditioned at 80° C. After the curing, the adhesive agent considerably spreading out of the bonding surface was removed with a cutter or the like in advance. After being conditioned in the above manner, the test specimen underwent a tensile test at a rate of 10 mm/min with a tester Autograph, product number "AG-I", manufactured by Shimadzu Corporation and the resulting maximum stress (MPa) was defined as the adhesion strength. The test was conducted five times and the average of the five resulting values was indicated as the average adhesion strength (tensile adhesion force) in Tables 1 and 2.

TABLE 1

| | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Composition (% by mass) | Liquid crystal polymer (A) | 68.75 | 68.50 | 68.25 | 68.00 | 67.00 | 68.00 | 66.00 | 69.00 |
| | Semi-aromatic polyamide resin (B) | 0.25 | 0.50 | 0.75 | 1.00 | 2.00 | 1.00 | 1.00 | — |
| | Barium sulfate (C) | 2.40 | 2.40 | 2.40 | 2.40 | 2.40 | 2.40 | 2.40 | 2.40 |
| Reinforcing material (D) | Surface-treated wollastonite fibers | 20.00 | 20.00 | 20.00 | 20.00 | 20.00 | — | 20.00 | 20.00 |
| | Untreated wollastonite fibers | — | — | — | — | — | 20.00 | — | — |
| | Surface-treated talc | 7.60 | 7.60 | 7.60 | 7.60 | 7.60 | 7.60 | 7.60 | 7.60 |
| | Particulate carbon material (E) | 1.00 | 1.00 | 1.00 | 1.00 | 1.00 | 1.00 | 1.00 | 1.00 |
| | Fluorine-contained resin (F) | — | — | — | — | — | — | 2.00 | — |

TABLE 1-continued

|  |  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Physical properties | Hunter brightness | 25.6 | 25.1 | 24.4 | 24.2 | 23.1 | 22.9 | 24.3 | 24.5 |
|  | Tensile strength (MPa) | 110 | 101 | 101 | 99 | 91 | 80 | 92 | 107 |
|  | Bending strength (MPa) | 130 | 128 | 124 | 125 | 107 | 111 | 119 | 131 |
|  | Bending modulus of elasticity (GPa) | 9.1 | 9.1 | 8.9 | 9.1 | 7.9 | 7.5 | 8.5 | 9.1 |
|  | IZOD impact value (J/m) | 121 | 134 | 119 | 101 | 47 | 54 | 68 | 118 |
|  | Melt viscosity (Pa · s) | 46 | 47 | 47 | 43 | 47 | 37 | 41 | 56 |
|  | Mold shrinkage (%) | 0.10 | 0.09 | 0.10 | 0.10 | 0.12 | 0.19 | 0.15 | 0.10 |
|  | Deflection temperature under load (° C.) | 244 | 236 | 235 | 233 | 209 | 236 | 224 | 251 |
|  | Amount of particles produced (ppm) | 0 | 0 | 0 | 0 | 75 | 0 | 0 | 0 |
|  | Tensile adhesion force (MPa) | 29 | 30 | 31 | 35 | 44 | 31 | 37 | 25 |

TABLE 2

|  |  | Ex. 8 | Ex. 9 | Ex. 10 | Ex. 11 | Ex. 12 | Ex. 13 |
|---|---|---|---|---|---|---|---|
| Composition (% by mass) | Liquid crystal polymer (A) | 66.00 | 65.00 | 64.00 | 63.00 | 68.00 | 68.00 |
|  | Semi-aromatic polyamide resin (B) | 3.00 | 4.00 | 5.00 | 6.00 | 1.00 | 1.00 |
|  | Semicrystalline polyester resin (PBT) | — | — | — | — | — | — |
|  | Semicrystalline polyester resin (PET) | — | — | — | — | — | — |
|  | Semicrystalline polyester resin (PCT) | — | — | — | — | — | — |
|  | Barium sulfate (C) | 2.40 | 2.40 | 2.40 | 2.40 | 2.40 | 2.40 |
| Reinforcing material (D) | Surface-treated wollastonite fibers | 20.00 | 20.00 | 20.00 | 20.00 | — | 20.00 |
|  | Untreated wollastonite fibers | — | — | — | — | — | — |
|  | Surface-treated potassium titanate fibers | — | — | — | — | 20.00 | — |
|  | Surface-treated talc | 7.60 | 7.60 | 7.60 | 7.60 | 7.60 | — |
|  | Untreated talc | — | — | — | — | — | 7.60 |
|  | Particulate carbon material (E) | 1.00 | 1.00 | 1.00 | 1.00 | 1.00 | 1.00 |
|  | Fluorine-contained resin (F) | — | — | — | — | — | — |
| Physical properties | Hunter brightness | 23.1 | 23.4 | 21.5 | 25.1 | 26.4 | 23.3 |
|  | Tensile strength (MPa) | 92 | 91 | 75 | 57 | 96 | 93 |
|  | Bending strength (MPa) | 118 | 118 | 104 | 88 | 136 | 124 |
|  | Bending modulus of elasticity (GPa) | 8.8 | 8.7 | 8.5 | 8.6 | 10.2 | 8.8 |
|  | IZOD impact value (J/m) | 35 | 39 | 39 | 27 | 67 | 58 |
|  | Melt viscosity (Pa · s) | — | — | 38 | 48 | 23 | 27 |
|  | Mold shrinkage (%) | 0.02 | 0.02 | 0.23 | 0.27 | 0.11 | 0.18 |
|  | Deflection temperature under load (° C.) | 226 | 224 | 225 | 225 | 232 | 245 |
|  | Amount of particles produced (ppm) | 95 | 57 | 38 | 573 | 589 | 318 |
|  | Tensile adhesion force (MPa) | 43 | 42 | 32 | 33 | 37 | 30 |

|  |  | Ex. 14 | Ex. 15 | Comp. Ex. 2 | Comp. Ex. 3 | Comp. Ex. 4 | Comp Ex. 5 |
|---|---|---|---|---|---|---|---|
| Composition (% by mass) | Liquid crystal polymer (A) | 69.00 | 68.00 | 71.40 | 68.00 | 68.00 | 68.00 |
|  | Semi-aromatic polyamide resin (B) | 1.00 | 1.00 | — | — | — | — |
|  | Semicrystalline polyester resin (PBT) | — | — | — | 1.00 | — | — |
|  | Semicrystalline polyester resin (PET) | — | — | — | — | 1.00 | — |
|  | Semicrystalline polyester resin (PCT) | — | — | — | — | — | 1.00 |
|  | Barium sulfate (C) | 2.40 | 2.40 | — | 2.40 | 2.40 | 2.40 |
| Reinforcing material (D) | Surface-treated wollastonite fibers | 20.00 | 27.60 | 20.00 | 20.00 | 20.00 | 20.00 |
|  | Untreated wollastonite fibers | — | — | — | — | — | — |
|  | Surface-treated potassium titanate fibers | — | — | — | — | — | — |
|  | Surface-treated talc | 7.60 | — | 7.60 | 7.60 | 7.60 | 7.60 |
|  | Untreated talc | — | — | — | — | — | — |
|  | Particulate carbon material (E) | — | 1.00 | 1.00 | 1.00 | 1.00 | 1.00 |
|  | Fluorine-contained resin (F) | — | — | — | — | — | — |
| Physical properties | Hunter brightness | 77.5 | 22.3 | 23.3 | 23.3 | 23.6 | 23.8 |
|  | Tensile strength (MPa) | 106 | 92 | 114 | 98 | 106 | 102 |
|  | Bending strength (MPa) | 129 | 126 | 133 | 122 | 131 | 127 |
|  | Bending modulus of elasticity (GPa) | 9.2 | 9.6 | 9.3 | 9.6 | 9.3 | 9.2 |
|  | IZOD impact value (J/m) | 67 | 73 | 75 | 42 | 55 | 43 |
|  | Melt viscosity (Pa · s) | 39 | 42 | 54 | — | — | — |
|  | Mold shrinkage (%) | 0.08 | 0.11 | 0.08 | 0.01 | 0.00 | 0.01 |
|  | Deflection temperature under load (° C.) | 232 | 231 | 254 | 228 | 228 | 241 |
|  | Amount of particles produced (ppm) | 673 | 37 | 1044 | 641 | 0 | 189 |
|  | Tensile adhesion force (MPa) | 32 | 40 | 23 | 24 | 24 | 20 |

As is obvious from Tables 1 and 2, a comparison of Examples 1 to 15 with Comparative Examples 1 to 5 shows that while the tensile adhesion forces of the molded liquid crystal polymer articles in Comparative Examples 1 to 5 are in a range of 20 MPa to 25 MPa, the tensile adhesion forces of the molded liquid crystal polymer articles in Examples 1 to 5 are improved to 29 MPa to 44 MPa according to the amount of the semi-aromatic polyamide resin (B) added and increased in order of increasing amount thereof added. Thus, the adhesion between components made of the molded liquid crystal polymer article or the adhesion between a component made of the molded article and other components can be increased. Furthermore, this shows that the incorporation of the semi-aromatic polyamide resin (B) into the liquid crystal polymer composition increases the adhesion force between the molded liquid crystal polymer article and epoxy adhesive agent as compared to the case where the liquid crystal polymer composition contains no semi-aromatic polyamide resin (B). In addition, it can be seen that, in the range of Examples 1 to 5, the adhesion force increases in proportion to the amount of the semi-aromatic polyamide resin (B) added.

In comparison between Example 4 and Example 7, while the tensile adhesion force of the molded liquid crystal polymer article of Example 4 containing no fluorine-contained resin (F) is 35 MPa, the tensile adhesion force of the molded liquid crystal polymer article of Example 7 containing the fluorine-contained resin (F) is 37 MPa, which shows that even when fluorine-contained resin is blended into the liquid crystal polymer composition, the adhesion force between the molded liquid crystal polymer article and epoxy adhesive agent is ensured.

A comparison between Example 4 and Example 6 shows that, with the use of the reinforcing material (D) surface-treated with an alkyl-based alkoxysilane coupling agent having a hydrophobic alkyl group, the adhesion force between the molded liquid crystal polymer article and epoxy resin further increases as compared to the case where the reinforcing material ((D) is not surface-treated with the alkyl-based alkoxysilane coupling agent.

The invention claimed is:

1. A liquid crystal polymer composition containing a liquid crystal polymer (A), a semi-aromatic polyamide resin (B), barium sulfate (C), and a reinforcing material (D),
wherein a surface of the reinforcing material (D) comprises a hydrophobic surface treatment agent, and
the hydrophobic surface treatment agent is alkoxysilane represented by a general formula (I) below:

$$R^1_n Si(OR^2)_{4-n}$$

wherein in the general formula (I) n represents an integer selected from 1 to 3, $R^1$ represents an alkyl group, an alkenyl group or an aryl group, and $R^2$ represents an alkyl group.

2. The liquid crystal polymer composition according to claim 1, wherein a fraction of a structural unit derived from an aromatic monomer in all structural units constituting the semi-aromatic polyamide resin (B) is 20% by mole or more.

3. The liquid crystal polymer composition according to claim 1, wherein the semi-aromatic polyamide resin (B) has a melting point of 230° C. to 350° C.

4. The liquid crystal polymer composition according to claim 1, wherein a content of the semi-aromatic polyamide resin (B) is 0.1% by mass to 5.0% by mass in a total amount of 100% by mass of the liquid crystal polymer composition.

5. The liquid crystal polymer composition according to claim 1, wherein the liquid crystal polymer (A) is a wholly aromatic liquid crystal polymer.

6. The liquid crystal polymer composition according to claim 1, wherein the reinforcing material (D) has an average fiber length of 1 μm to less than 300 μm.

7. The liquid crystal polymer composition according to claim 1, wherein the reinforcing material (D) is at least one type of fibers selected from potassium titanate fibers and wollastonite fibers.

8. The liquid crystal polymer composition according to claim 1, wherein a content of the reinforcing material (D) is 0.1% by mass to 40% by mass in a total amount of 100% by mass of the liquid crystal polymer composition.

9. A camera module comprising the liquid crystal polymer composition according to claim 1.

10. A molded liquid crystal polymer article being a molded article of the liquid crystal polymer composition according to claim 1.

* * * * *